United States Patent [19]
Nakamura

[11] Patent Number: 5,982,450
[45] Date of Patent: Nov. 9, 1999

[54] COLOR VIDEO SIGNAL PROCESSOR INCLUDING SWITCHED CAPACITOR FILTER AND DRIVE PULSE GENERATOR

[75] Inventor: Kenji Nakamura, Kanagawa-ken, Japan

[73] Assignee: Kabushiki Kaisha Toshiba, Kawasaki, Japan

[21] Appl. No.: 08/955,705

[22] Filed: Oct. 23, 1997

[30] Foreign Application Priority Data

Oct. 23, 1996 [JP] Japan ................................. 8-280847

[51] Int. Cl.$^6$ ................................. H04N 9/64; H04N 5/46
[52] U.S. Cl. ........................ 348/554; 348/708; 348/521; 348/540
[58] Field of Search .................................. 348/571, 708, 348/554, 555, 521, 536, 540; H04N 9/64, 5/46, 3/27

[56] References Cited

PUBLICATIONS

IEEE Transactions on Consumer Electronics; vol. 42; No. 3; Aug. 1996; Single–Chip BICMOS Multistandard Video Processor; Akihiro Murayama et al.; pp. 739–749.

*Primary Examiner*—Sherrie Hsia
*Attorney, Agent, or Firm*—Oblon, Spivak McClelland, Maier & Neustadt, P.C.

[57] ABSTRACT

A video signal processor for use in a multi-color standard color video apparatus including a horizontal synchronizing signal generator and a baseband circuit provided on a same LSI chip as a video signal processor. The baseband circuit includes a switched capacitor filter having a switched capacitor array. A driving pulse generator for driving the switched capacitor filter is included on the same LSI chip and synchronizes to horizontal signals in a received video signal of a particular color-standard.

9 Claims, 3 Drawing Sheets

COLOR VIDEO SIGNAL PROCESSOR INCLUDING SWITCHED CAPACITOR FILTER AND DRIVE PULSE GENERATOR

BACKGROUND OF THE INVENTION

The priority application number P08-280847 is incorporated herein by reference.

1. Field of the Invention

The present invention relates to a color video signal processor and in particular, to a video signal demodulation circuit used in a multi-color-standard video apparatus.

More particularly, the present invention relates to a baseband delaying circuit for delaying a baseband chroma signal during one horizontal scanning period used in a video signal demodulation circuit for a color system of the multi-color standard systems.

Furthermore, the present invention relates to a color video signal processor and a baseband chroma signal delaying circuit provided on a same large-scale integrated (LSI) circuit chip.

2. Discussion of the Background

In many types of video equipment, such as color television (TV) receivers or video tape recorders (VTR), a baseband delaying circuit is provided in a video signal processor for delaying video signals for one horizontal scanning, period (hereinafter referred to as "IH") in order to demodulate color video signals from a received video signal of a particular type of color standard. The baseband delay circuit is used for delaying a chroma signal an appropriate amount in accordance with a particular frequency range of a delaying target signal.

Presently, there are several types of color TV standard systems for transmitting color television signals, such as NTSC (National Television System Committee) color system, PAL color system and SECAM (Sequenticel Couleur A Memorie) color system. Consequently, a multicolor standard color television receiver has been developed as an export specification in order for the receiver to receive any of a selected appropriate color TV standard in a country of export.

Generally, in a PAL color TV system a received chroma signal is demodulated into two orthogonal phases by changing a demodulation axis every horizontal scanning period. Under the PAL standard, a frequency of about 4.433 MHZ is used as a sub-carrier for the chroma signal. In a SECAM color TV system, a received chroma signal is demodulated with a sub-carrier by alternately changing the subcarrier frequency from 4.40625 MHZ to 4.24 MHZ every horizontal scanning period. A multi-color-standard video apparatus as described above needs a baseband delaying circuit for delaying a received chroma signal during one horizontal scanning period and the delay is usually set to 64 $\mu$s, in accordance with a frequency range of a particular received color standard in a given country.

An ultrasonic delaying device or an electronic delaying circuit such as a charge coupled device (CCD) has been used conventionally as the baseband delaying apparatus for achieving the 1H delay. As a propagation medium, a fused glass has been used in the ultrasonic delaying device.

However, the conventional delaying devices have been provided as a separate element from an LSI video signal processor. Consequently, a total system including the video signal processor and the baseband delaying circuit requires a large amount of system real estate. Furthermore, manufacturing cost increases with the increase in system real estate. Accordingly, there are disadvantages to producing a multicolor-standard color video processor having a separate baseband delaying circuit.

As mentioned above, the conventional video signal processor including a baseband delaying circuit has many problems and defects. Instead of using a CCD delaying device, a switched capacitor filter as an electronic delaying device has been considered. In this case, however, it is very difficult to optimize the total system real estate to accommodate the video signal processor and the baseband delaying circuit.

SUMMARY OF THE INVENTION

Accordingly, it is an object of the present invention is to solve the above-mentioned problems and defects of the conventional video signal processor having a baseband delaying circuit.

It is another object of the present invention to provide a video signal processor having a compact size by providing a baseband delaying circuit on a same LSI chip as the video signal processor.

It is a further object of the present invention to provide an optimized video signal processor having a baseband delaying circuit provided on a same LSI chip as the video signal processor and using a switched capacitor filter.

It is a still further object of the present invention to provide an optimized multi-color-standard video signal processor having a switched capacitor filler as a baseband delaying circuit driven by horizontal synchronizing signals generated from a horizontal signal generator on a same LSI chip.

It is a still further object of the present invention to provide an optimized multi-color-standard video signal processor having a baseband delaying circuit with reduced manufacturing costs.

These and other objects are achieved according to the present invention by providing a video signal processor including a horizontal signal generator for generating signals that are synchronized with horizontal signals included in video signals of a particular received standard color system, a switched capacitor filter for delaying baseband chroma signal components among the video signals during one horizontal scanning period, the switched capacitor filter provided on a same chip as the horizontal signal generator, and a pulse generator for generating a plurality of pulses synchronized with the horizontal synchronizing signals from the horizontal signal generator, wherein the plurality of pulses includes at least shift pulse signals for driving the switched capacitor filter, sampling pulses and charge voltage conversion pulses.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
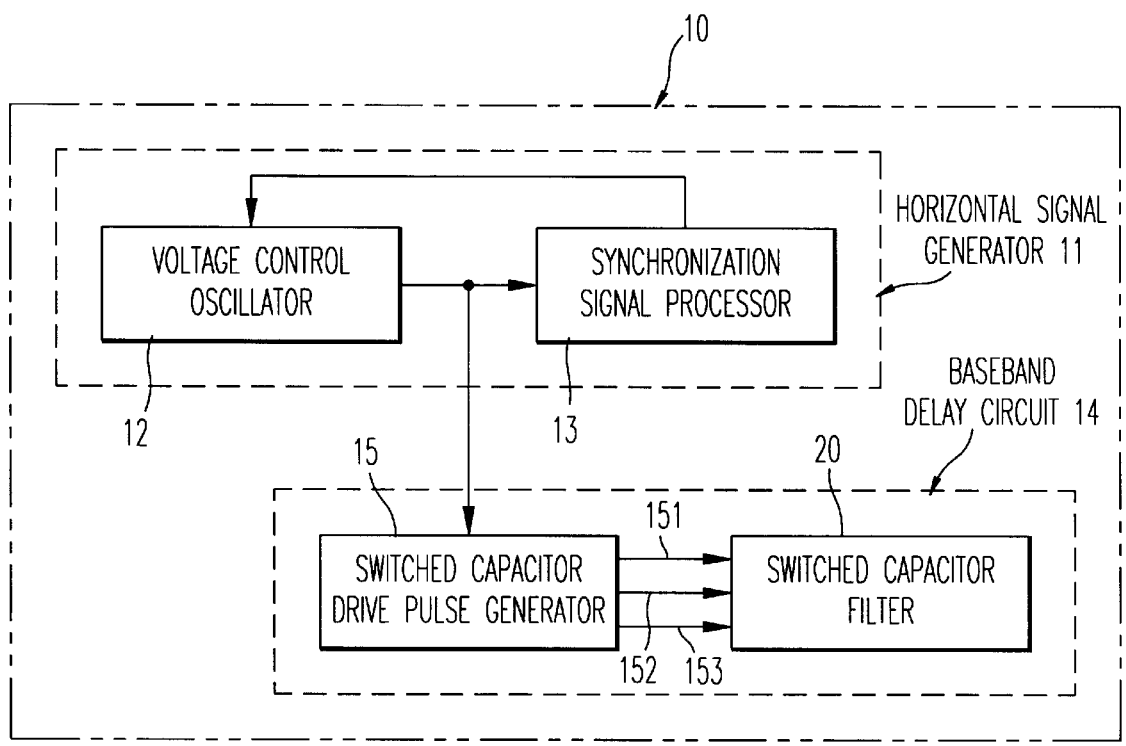
FIG. 1 is a block diagram showing a portion of a video signal processing large scale integrated (LSI) circuit including a baseband delay circuit according to the present invention.

Referring now the drawings, wherein like reference numerals designate identical or corresponding parts throughout the several views, and more particularly with to FIG. 1 thereof, there is illustrated a video signal processor LSI 10 includes a horizontal signal generator 11 and a baseband delay circuit 14.

The horizontal signal generator 11 is a prerequisite element for accomplishing basic operations of the baseband delay circuit 14. The horizontal signal generator 11 includes a voltage controlled oscillator (VCO) 12 and a synchronization signal processing circuit (DEF) 13 so as to form a phased lock loop (PLL).

The voltage controlled oscillator (VCO) 12 generates clock signals of, for example, 6 MHZ. The clock signals are fed back to the voltage controlled oscillator 12 through the synchronization signal processing circuit (DEF) 13. The horizontal signal generator 11 generates stable horizontal synchronization signals that are synchronized to the horizontal synchronization signals in the received video signals of a particular standard of the color system standards.

The baseband delay circuit 14 includes a switched capacitor drive pulse generator 15 and a switched capacitor filter 20 for delaying a respective baseband chroma signal that is included in the received video signals during 1H. The switched capacitor drive pulse generator 15 generates a plurality of drive pulses for driving the switched capacitor filter 20. The drive pulses include, at least, shift pulse signals 151 (C1 and C2), sampling pulses 152 (DATA or SO) and charge voltage conversion pulses 153 (Reset, S/H1, S/H2) for driving the switched capacitor filter 20.

The switched capacitor drive pulses are generated by dividing the stable horizontal synchronization signals from the voltage control oscillator (VCO) 12. That is, the switched capacitor drive pulses synchronize to the horizontal synchronization signals in a particular received color system standard.

Figure 2:
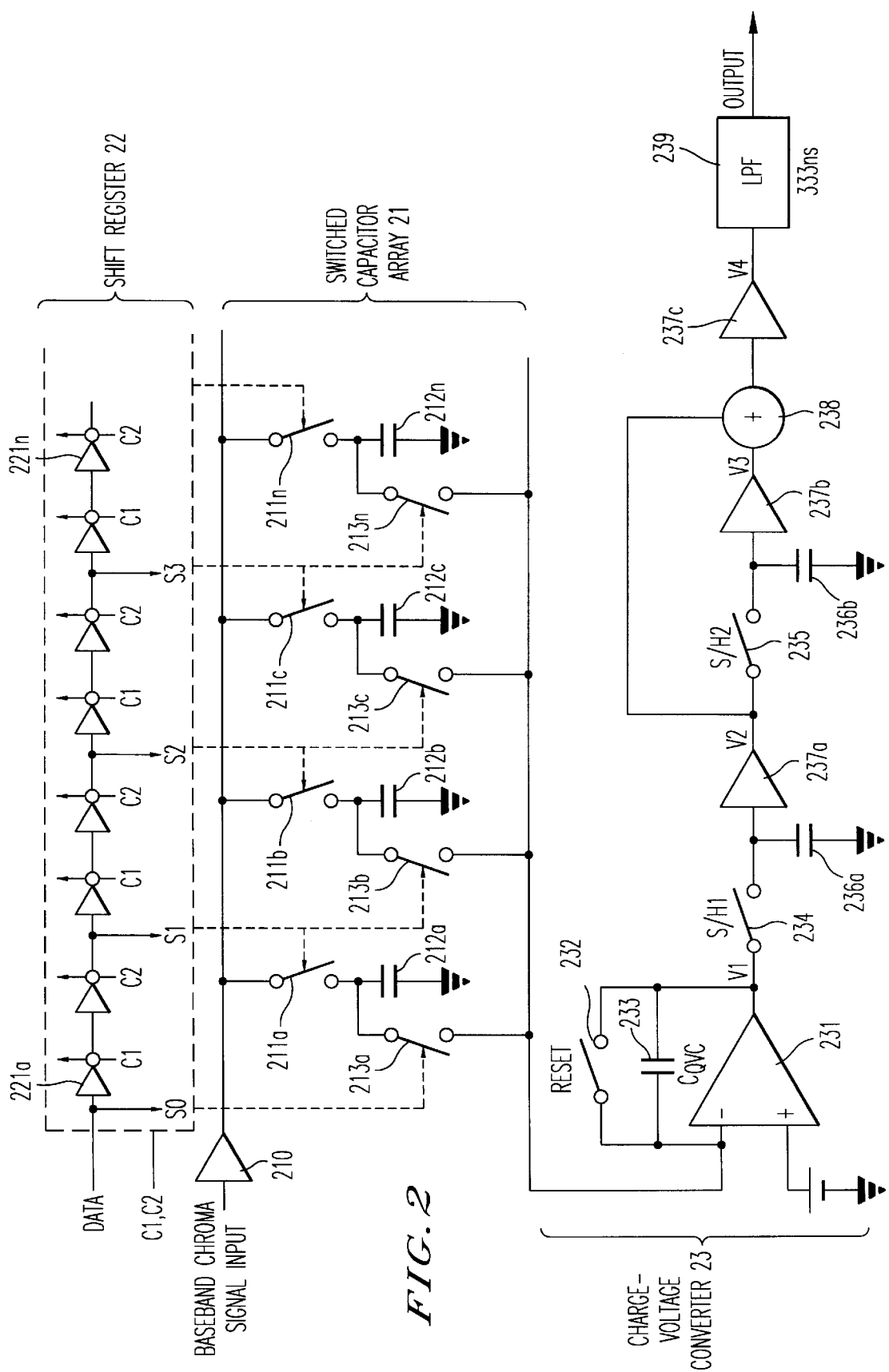
FIG. 2 is a circuit diagram of a switched capacitor filter of FIG. 1.

FIG. 2 depicts a partial circuit construction of the baseband delay circuit 14 of FIG. 1. As shown in FIG. 2, the baseband delay circuit 14 includes a switched capacitor array portion 21, a shift register portion 22 and a charge voltage conversion circuit 23. The switched capacitor array portion 21 receives baseband chroma signals through a buffer circuit 210. The buffered chroma signals are successively sampled by a predetermined number of writing switches 211a, 211b, 211c, . . . and 211n. The sampled chroma signals are successively held in a predetermined number of capacitors 212a, 212b, 212c, . . . and 212n as a held charge. The charges held in the capacitors 212a, 212b, 212c, . . . and 212n are successively read out through a predetermined number of switches 213a, 213b, 213c, . . . and 213n.

The shift register portion 22 is comprised of a plurality of clocked inverters 221a, 221b, 221c, . . . and 221n. The plurality of clocked inverters shifts the input DATA by the two phases of shift pulses C1 and C2 received from the horizontal signal generator 11 of FIG. 1. Then a plurality of sampling pulses S0, S1, S2, . . . and Sn are successively supplied from the respective output stages of the shift register 22 to the read out switches 213a, 213b, 213c, . . . and 231n.

The respective numbers of stages of the switched capacitor array 21 and of the shift register 22 are determined in accordance with the required accuracy for the frequency characteristics of the delaying signal. According to the present invention, for example, the preferable number of stages is set to 192 in order to obtain a required delaying amount of 64 μs by using the sampling pulses S0, S1, S2, and Sn having 3 MHZ cycles.

The charge-voltage converter 23 includes an operational amplifier 231, a reset switch 232, a feedback capacitor 233, a plurality of sampling switches 234 and 235, a plurality of hold capacitors 236a and 236b, a plurality of buffer circuit 237a, 237b and 237c, and an adder 238. The charge-voltage converter 23 converts the input charge from the switched capacitor array 21 to output voltages. A low pass filter (LPF) 239 is inserted at the output stage of the charge-voltage converter 23 for eliminating switching noise.

A reset pulse signal is supplied to the reset switch 232 by the drive pulse generator 15 of FIG. 1. In accordance with charge-voltage converting signals S/H 1 and S/H 2, having two phases and supplied by the drive pulse generator 15 of FIG. 1, the two sampling switches 234 and 235 are respectively controlled.

Figure 3:
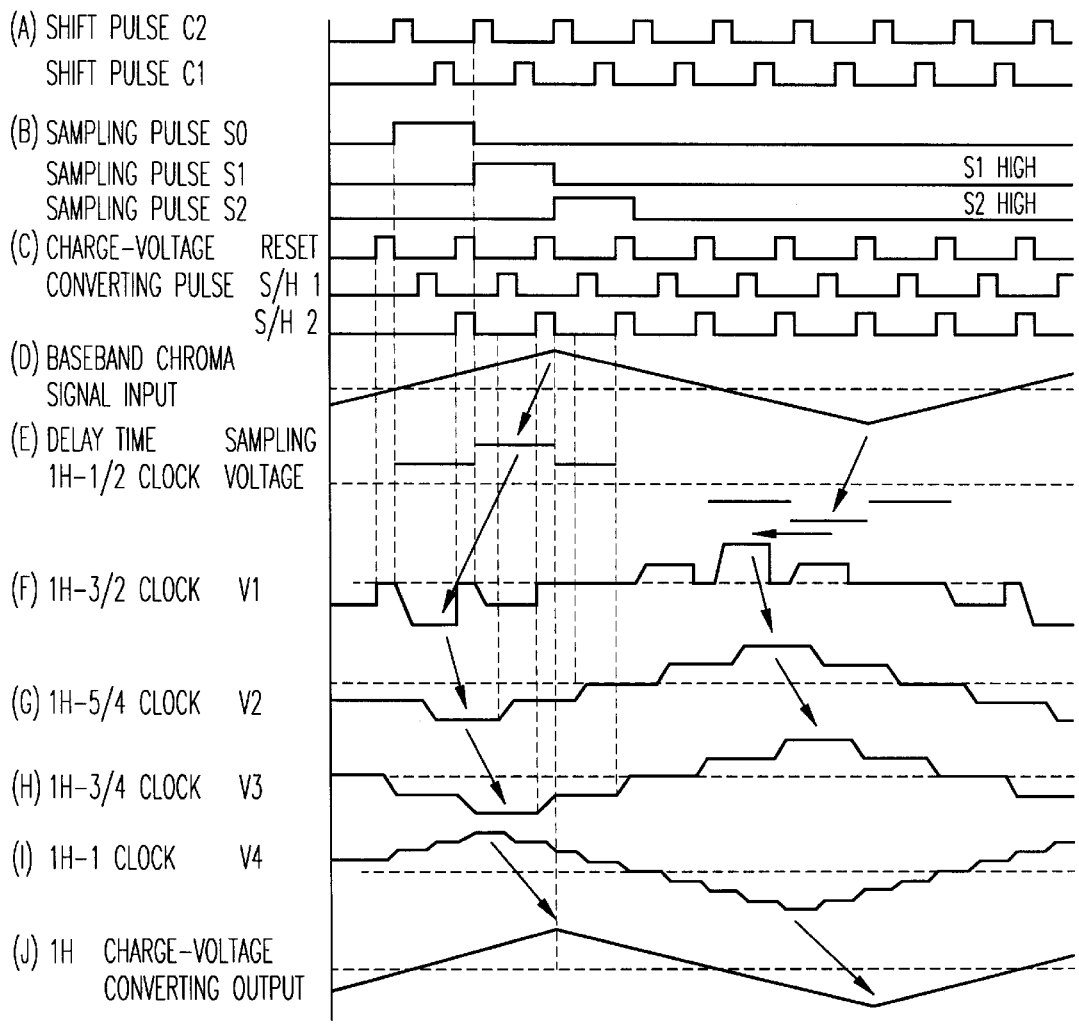
FIG. 3 is a timing diagram of timing pulses and waveforms of the circuit of FIG. 1.

FIGS. 3(A) to 3(J) show the respective waveforms for driving the switched capacitor filter 20 of FIG. 2. The two phases shift pulses C1 and C2 (signals 151 in FIG. 1) generate the sampling pulse (DATA or SO) as shown in FIGS. 3(A) and 3(B). This sampling pulse decides a timing of charge holding by dividing the one horizontal scanning period (1H). For example, the sampling pulse SO decides the operational timing of the readout switch 231a. The sampling pulse S1 decides the operational timing both of the writing switch 211a and the readout switch 213b for reading out the held charge at a previous 1H and so on. When reading out the charge at the previous 1H, the voltage during the charge-voltage converting pulse S/H 1 (signal 152 in FIG. 1) is held at the hold capacitor 236a in FIG. 2. The RESET pulse in FIG. 3(C) zeroes the contents of the feedback capacitor 233. The baseband chromo signal input waveform is shown in, for example, FIG. 3(D) and the sampling voltage waveform at the inverting (−) input of the operational amplifier 231 is shown in, for example, FIG. 3(E). The charge-voltage converting pulse S/H 2 is for over-sampling. As can be seen from the timing diagram in FIG. 3(C), the RESET signal has the same timing operation as the signal S/H2. The signals V1 to V4 in FIGS. 3(F)–3(I) illustrate the respective waveforms at the respective stages in the charge-voltage convert 23 when the input baseband chroma signal is supplied to the switched capacitor array as shown in FIG. 2. Furthermore, it can be appreciated that FIG. 3(G)–3(I) indicate that the circuit 237c in the charge voltage conversion circuit 23 performs a reversal of the signal. That is, after summing the V2 signal from the circuit 237a and the V3 signal from the circuit 237b and then dividing by 2, the circuit 237 generates the reversed V4 signal. The charge-voltage converting output waveform of the LPF 239 in shown in, for example, FIG. 3(J).

The video signal processor LSI 10 according to the present invention is constructed by using a BI-CMOS process and is comprised of a mixture of bipolar circuits and CMOS circuits such as the switched capacitor filter 20.

As previously described, the baseband delay circuit according to the present invention includes both the switched capacitor drive pulse generator 15 and the switched capacitor filter on a same chip as the video signal processor. Further, since the switched capacitor drive signals are based upon the horizontal synchronizing signals generated from the horizontal synchronizing generator provided on the same LSI chip, a number of LSI chips required is reduced.

Accordingly, it is also possible to optimize the total system of the video signal processor with the baseband delaying circuit. Furthermore, it is possible to make the video signal processor including the baseband delaying circuit compact in size so as to reduce manufacturing costs.

Obviously, numerous modifications and variations of the present invention are possible in light of the above teachings. It is therefore to be understood that within the scope of the appended claims, the invention may be practiced otherwise than as specifically described herein.

What is claimed is as new and desired to be secured by Letters Patent of the United States is:

1. A video signal processor, comprising:

a horizontal synchronizing signal generator for generating stable horizontal synchronizing signals synchronized to horizontal signals received in a video signal of a particular color system standard;

a baseband circuit, including:
      a switched capacitor filter for delaying a baseband chroma signal in the received video signal during one horizontal scanning period, and
      a switched capacitor drive pulse generator for generating a plurality of drive pulses for driving the switched capacitor filter synchronized to the horizontal signals in the received video signal;

wherein the horizontal synchronizing signal generator and the baseband circuit are provided on a same LSI chip.

2. The video signal processor according to claim 1, wherein the switched capacitor filter comprises:

a predetermined number of writing and reading switches;

a switched capacitor array for holding charges in a predetermined number of holding capacitors by successively sampling the baseband chroma signal in accordance with the predetermined number of writing switches and by successively reading charges held in the holding capacitors in accordance with the predetermined number of reading switches;

a shift register array comprised of a plurality of clocked inverters for successively providing a plurality of sampling pulses from respective inverters to the switched capacitor array; and a charge-voltage converter for converting the charge provided from the switched capacitor array to an output voltage synchronized to a charge-voltage converting pulse.

3. The video signal processor according to claim 1, wherein:

the horizontal synchronizing signal generator is comprised of a voltage controlled oscillator for generating clock signals of a predetermined frequency and a synchronization signal processor; and the voltage controlled oscillator and the synchronization signal processor form a phase lock loop.

4. The video signal processor according to claim 3, wherein:

the switched capacitor drive pulse generator generates shift pulses, sampling pulses and charge-voltage converting pulses by dividing an output signal of the voltage controlled oscillator.

5. The video signal processor according to claim 2, wherein:

the switched capacitor filter includes a low pass filter at an output stage of the charge-voltage converter for eliminating switching noise.

6. The video signal processor according to claim 2, wherein:

the switched capacitor array and the shift register array include 192 stages; and the switched capacitor drive pulse generator generates the plurality of drive pulses each having a 3 MHZ cycle.

7. The video signal processor according to claim 1, wherein the LSI chip comprises bipolar and CMOS circuit elements using a BI-CMOS process.

8. A multi-standard type color television receiver including a video signal processor according to claim 1.

9. A multi-standard type color television receiver including a video signal processor according to claim 2.

* * * * *